US012548053B2

(12) United States Patent
He et al.

(10) Patent No.: US 12,548,053 B2
(45) Date of Patent: Feb. 10, 2026

(54) ACCOUNT MANAGER VIRTUAL ASSISTANT USING MACHINE LEARNING TECHNIQUES

(71) Applicant: CDW LLC, Vernon Hills, IL (US)

(72) Inventors: Yuxi He, Boulder, CO (US); Yuqing Chen, Evanston, IL (US); Sunrito Bhattacharya, Chicago, IL (US); Rajat Swaroop, Wheeling, IL (US); Gregory Tomezak, Buffalo Grove, IL (US)

(73) Assignee: CDW LLC, Vernon Hills, IL (US)

( * ) Notice: Subject to any disclaimer, the term of this patent is extended or adjusted under 35 U.S.C. 154(b) by 199 days.

(21) Appl. No.: 17/125,812

(22) Filed: Dec. 17, 2020

(65) Prior Publication Data

US 2021/0103965 A1 Apr. 8, 2021

Related U.S. Application Data

(62) Division of application No. 16/293,205, filed on Mar. 5, 2019, now Pat. No. 10,902,490.

(Continued)

(51) Int. Cl.
*G06Q 30/0601* (2023.01)
*G06F 40/20* (2020.01)
(Continued)

(52) U.S. Cl.
CPC ......... *G06Q 30/0611* (2013.01); *G06F 40/20* (2020.01); *G06F 40/284* (2020.01); *G06N 20/20* (2019.01); *G06N 3/08* (2013.01)

(58) Field of Classification Search
CPC ..... G06F 40/20; G06F 40/284; G06K 9/6256; G06N 20/20; G06N 3/08;
(Continued)

(56) References Cited

U.S. PATENT DOCUMENTS 7,415,435 B1 8/2008 Weiss et al.
7,440,911 B1 * 10/2008 Fors .................. G06Q 30/0611
705/26.4

(Continued)

FOREIGN PATENT DOCUMENTS

CN 106682089 A * 5/2017 ........... G06F 16/355
CN 110913354 A * 3/2020
(Continued)

OTHER PUBLICATIONS

Wikipedia "Artificial Intelligence," Dec. 27, 2018. 69pp. retrieved from: https://en.wikipedia.org/w/index.php?title=Artificial_intelligence&oldid=875602267 (Year: 2018).*

(Continued)

*Primary Examiner* — Adam L Levine
(74) *Attorney, Agent, or Firm* — MARSHALL, GERSTEIN & BORUN LLP; Randall G. Rueth

(57) ABSTRACT

An account manager virtual assistant computing system includes a processor and a memory storing instructions that when executed cause the system to receive a message, process the message using a quote classification machine learning model, generate a response including price information, and process the message using an information extraction machine deep learning model; and transmit the response. A non-transitory computer readable medium includes program instructions that when executed cause a computer to receive a message, process the message using a quote classification machine learning model, generate a response including price information, and process the message using an information extraction machine deep learning model; and transmit the response. An account manager virtual assistant method includes receiving a message, processing the message using a quote classification machine learning model, generating a response including price information, and processing the message using an information (Continued)

extraction machine deep learning model; and transmitting the response.

17 Claims, 5 Drawing Sheets

Related U.S. Application Data

(60) Provisional application No. 62/786,196, filed on Dec. 28, 2018.

(51) Int. Cl.
*G06F 40/284* (2020.01)
*G06N 20/20* (2019.01)
*G06N 3/08* (2023.01)

(58) Field of Classification Search
CPC ......... G06Q 30/06–0645; G06Q 30/08; G06Q 50/01; G16Y 10/00–90
See application file for complete search history.

(56) References Cited

U.S. PATENT DOCUMENTS

| | | | | |
|---|---|---|---|---|
| 7,725,329 | B2 * | 5/2010 | Kil | G16Z 99/00 705/2 |
| 7,908,200 | B2 * | 3/2011 | Scott | G06Q 10/0875 705/37 |
| 8,140,402 | B1 * | 3/2012 | Mesaros | G06Q 30/0601 705/26.1 |
| 10,361,981 | B2 * | 7/2019 | Bennett | G06Q 10/10 |
| 10,475,095 | B2 | 11/2019 | Scott et al. | |
| 10,769,159 | B2 * | 9/2020 | Lyons | G06Q 30/02 |
| 11,455,462 | B2 * | 9/2022 | Middendorf | G06V 30/412 |
| 11,663,409 | B2 * | 5/2023 | Terry | G06F 16/34 706/12 |
| 2002/0069079 | A1 * | 6/2002 | Vega | G06Q 50/188 705/80 |
| 2016/0335572 | A1 * | 11/2016 | Bennett | G06Q 10/107 |
| 2018/0144309 | A1 * | 5/2018 | Rolle | H04L 51/216 |
| 2019/0042988 | A1 * | 2/2019 | Brown | G06N 5/022 |

FOREIGN PATENT DOCUMENTS

| | | | | |
|---|---|---|---|---|
| CN | 110084710 B | * | 12/2022 | ....... G06F 17/30884 |
| EP | 3068080 A1 | * | 9/2016 | |
| WO | WO-2019125445 A1 | * | 6/2019 | |

OTHER PUBLICATIONS

Suh-Lee, "Text mining for security threat detection discovering hidden information in unstructured log messages," 2016 IEEE Conference on Communications and Network Security (CNS), pp. 252-260. (Year: 2016).*
Wikipedia: "Artificial Intelligence", retrieved from the Internet at: <https://en.wikipedia.org/w/index.php?title=Artifical_intelligence&oldid=875602267> (Dec. 27, 2018).
Wikipedia: "Extract, transform, load", retrieved from the Internet: <https://en.wikipedia.org/w/index.php?title=Extract,_transform_load&oldid=873266315> (Dec. 12, 2018).
International Application No. PCT/US2019/067475, International Search Report and Written Opinion, mailed Mar. 16, 2020.
International Application No. PCT/US2019/067721, International Search Report and Written Opinion, mailed Mar. 16, 2020.
Zhang et al., Character-level convolutional networks for text classification, arXiv:1509.01626 [cs.LG] (2016).
Apache NiFi, downloaded from the Internet at: <https://nifi.apache.org/>, The Apache Software Foundation (2018).

* cited by examiner

ACCOUNT MANAGER VIRTUAL ASSISTANT USING MACHINE LEARNING TECHNIQUES

CROSS-REFERENCE TO RELATED APPLICATION

This Application is a Divisional of application Ser. No. 16/293,205, entitled ACCOUNT MANAGER VIRTUAL ASSISTANT USING MACHINE LEARNING TECHNIQUES, filed on Mar. 5, 2019, which is incorporated by reference herein in its entirety. Application Ser. No. 16/293,205 claims the benefit of U.S. Provisional Application 62/786,196, entitled ACCOUNT MANAGER VIRTUAL ASSISTANT USING MACHINE LEARNING TECHNIQUES, filed on Dec. 28, 2018, which is incorporated by reference herein in its entirety.

FIELD OF THE DISCLOSURE

The present disclosure generally relates to systems and methods for an account manager (AM) virtual assistant for facilitating quotes and orders. More particularly, to methods and systems for facilitating automated quote and order processing via electronic communication using machine learning (ML) techniques.

BACKGROUND

Many companies operate in business areas wherein human AMs manually facilitate product quotation and ordering processes directly with customers. AMs may facilitate a request for quote (RFQ), generate a quotation and/or generate an order. Manual work performed by AMs is time-consuming, repetitive and error-prone. For example, an AM may receive an RFQ from a customer, and generate one or more quote and/or order based on the RFQ. An RFQ is often communicated to a company via an electronic communication means (e.g., via an Internet web site, an email, via telephone, etc.). Traditionally, an employee of the company (e.g., a quote processor, AM, or other employee) may receive RFQs, interpret the RFQ, validate the RFQ, route the RFQs to an appropriate person (e.g., an AM) and handle any follow-up, whether that follow-up is internal to the company or involves additional communication with the customer. Processing the RFQ may include the application of considerations specific to individual customers (e.g., discounts). Processing the RFQ may include modifying the RFQ and any subsequent quotations/orders in response to feedback from the customer as well as business constraints. For example, a quote may be modified in response to updated quantity, inventory levels, customer cancellations or other conditions.

An RFQ may identify one or more products and each identified product may correspond to a quantity. The customer may express interest in a given quantity of a given product using natural language. For an example, a customer may telephone an AM state, "I need to order 16 widgets." The employee interpreting the RFQ may manually extract information from the RFQ pertaining to the customer, the products and the quantities (e.g., whether the customer is previously known to the company, an identification of widgets being ordered, the respective quantity of those widgets, etc.). The employee may manually check an inventory and/or product information source and then manually generate a written quote and/or an order based on the information extracted. The employee may transmit the manually-generated quote and/or order to another employee (e.g., an AM) and/or to the customer who transmitted the RFQ to the company. These manual processes may be repeated for each RFQ transmitted to the company.

BRIEF SUMMARY

In one aspect, an account manager virtual assistant computing system includes a processor, and a memory storing computer-readable instructions that, when executed, cause the account manager virtual assistant system to receive an electronic message from a user. In some embodiments, the memory stores further computer-readable instructions that, when executed, cause the account manager virtual assistant system to process the electronic message using a trained classification machine learning model to generate a classification data set including an indication of whether the electronic message is a request for quote. In some embodiments, the memory stores further computer-readable instructions that, when executed, cause the account manager virtual assistant system to, when the electronic message is a request for quote, generate a response including price information corresponding to each of the set of item and quantity tuples, and process the electronic message using a trained information extraction machine learning model to generate an information extraction data set including a set of item and quantity tuples, wherein the trained information extraction machine learning model is a deep learning model. In some embodiments, the memory stores further computer-readable instructions that, when executed, cause the account manager virtual assistant system to transmit the response to the user of the electronic message.

In another aspect, a non-transitory computer readable medium contains program instructions that when executed, cause a computer to receive an electronic message from a user, process the electronic message using a trained classification machine learning model to generate a classification data set including an indication of whether the electronic message is a request for quote, process the electronic message using a trained information extraction machine learning model to generate an information extraction data set including a set of item and quantity tuples, wherein the trained information extraction machine learning model is a deep learning model, when the electronic message is a request for quote, generate a response including price information corresponding to each of the set of item and quantity tuples; and transmit the response to the user of the electronic message.

In yet another aspect, a computer-implemented account manager virtual assistant method includes receiving an electronic message from a user, processing the electronic message using a trained classification machine learning model to generate a classification data set including an indication of whether the electronic message is a request for quote, processing the electronic message using a trained information extraction machine learning model to generate an information extraction data set including a set of item and quantity tuples, wherein the trained information extraction machine learning model is a deep learning model. In some embodiments, the method includes, when the electronic message is a request for quote, generating a response including price information corresponding to each of the set of item and quantity tuples; and transmitting the response to the user of the electronic message.

DETAILED DESCRIPTION

The present techniques include a virtual AM digital assistant for interpreting, classifying and processing RFQs, quotes and order instructions. A multi-brand technology solutions company may provide a broad array of offerings, ranging from hardware and software to information technology (IT) product (e.g., security, cloud, data center and networking) services and solutions to customers in the public and private sectors. The technology solutions company may employ AMs who may receive many (e.g., thousands) respective RFQs per day from groups of customers relating to the different products and services the technology solutions company provides. The present techniques advantageously automate the interpretation and identification of specific customer requests and automate the AMs' facilitation of such requests.

The present techniques may include training one or more ML models using electronic messages (e.g., an email, a text message, etc.) sent to the company using one or more ML models. The one or more ML models may be trained to recognize specific requests of customers and/or AMs. For example, a general RFQ email inbox and/or an inbox of an AM may be monitored. Emails delivered to the email inbox may be automatically forwarded to an RFQ processing module in response to an event (e.g., the delivery of an email) to be analyzed by one or more trained ML model. The present techniques may process the output of the trained ML models to respond to the specific requests of the customer and/or AM. The present techniques may include information extraction and quote classification processes which are implemented using big data tools (e.g., Apache Hadoop and/or Apache NiFi), and the company may construct parallel computing environments for various purposes (e.g., for testing, development and production).

Example Computing Environment

Figure 1:
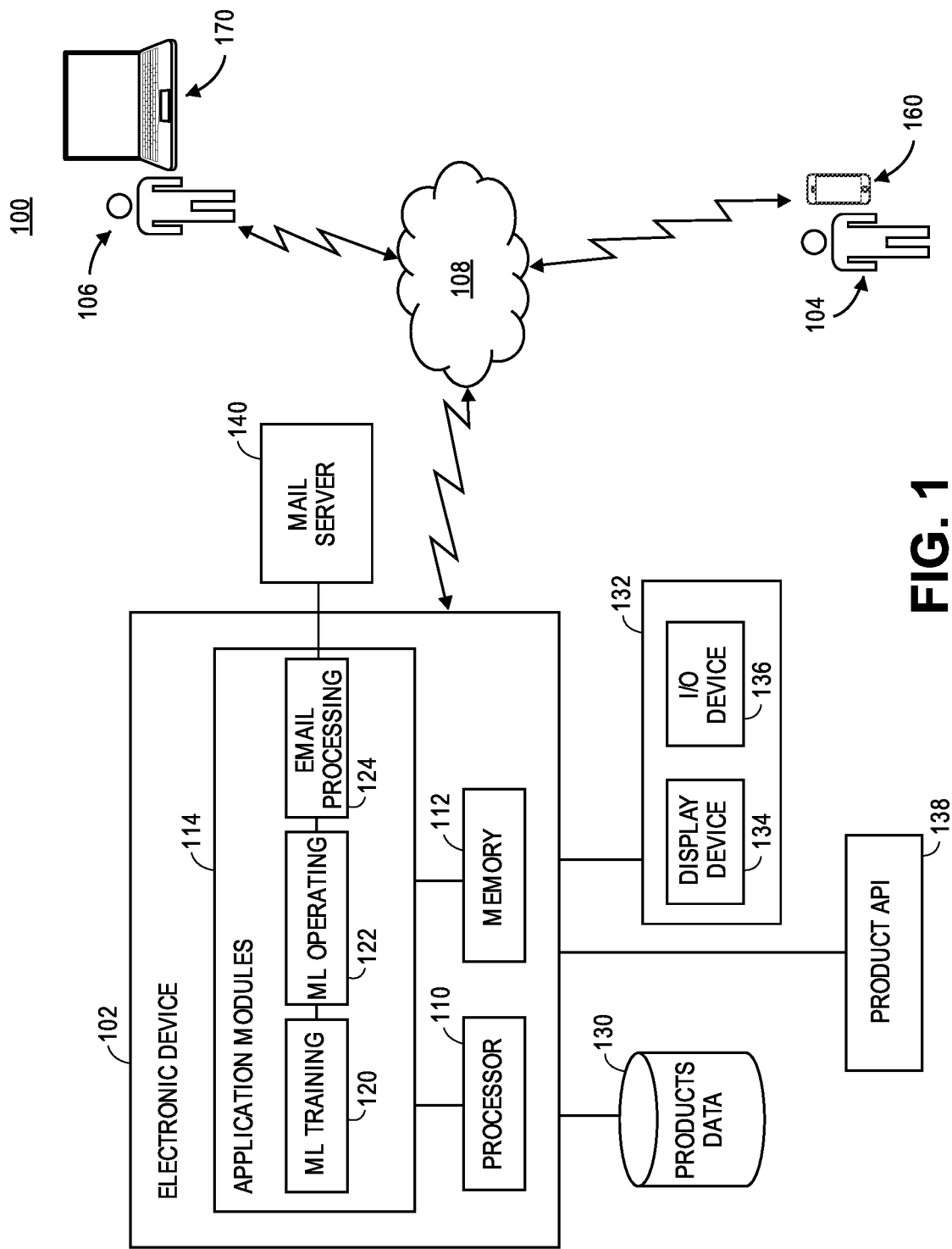
FIG. 1 depicts a system block diagram of an example environment for implementing an AM virtual assistant using machine learning techniques, according to an embodiment.

FIG. 1 depicts an example AM virtual assistant computing environment 100 in which the present techniques may be implemented, according to some embodiments. FIG. 1 may include an electronic device 102, a customer 104, an AM 106, and a network 108. The customer 104 and the AM 106 may access the electronic device 102 via the network 108. One or more customer 104 and one more AM 106 may be present in some embodiments.

The electronic device 102 may be a computing device such as a desktop computer, laptop, or server. The electronic device 102 may include a processor 110, a memory 112, and a set of application modules 114. The processor 110 may include any number of processors, including one or more graphics processing unit (GPU) and/or one or more central processing unit (CPU). In some embodiments, the processor 110 may include specialized parallel processing hardware configurations to permit the electronic device 102 to simultaneously train and/or operate multiple ML models (e.g., multiple GPUs, application-specific integrated circuits (ASICs), etc.). The memory 112 may include a random-access memory (RAM), a read-only memory (ROM), a hard disk drive (HDD), a magnetic storage, a flash memory, a solid-state drive (SSD), and/or one or more other suitable types of volatile or non-volatile memory. The processor 110 may execute computer-executable instructions stored in the memory 112. For example, the processor 110 may execute code stored in an SSD, causing data (e.g., a data set, a trained ML model, an email file, etc.) to be loaded into a RAM. The processor 110 may also cause an email file to be read from a file (e.g., from a memory or from a network location). The processor 110 may execute instructions stored in the memory 112 which instantiate, or load, the application modules 114.

The application modules 114 may include a plurality of sets of computer-executable instructions for performing the techniques described herein. For example, the application modules 114 may include an ML training module 120, an ML operating module 122, and an email processing module 124. Multiple processors 110 may execute the computer-executable instructions comprising the application modules 114 in parallel, such that for example, the ML training module 120 and the email processing module 124 may be used simultaneously by two or more processors 110 to, respectively, train an ML model and process an email input.

In general, the ML training module 120 creates new ML models, loads data (e.g., training data, trained models, etc.), trains the ML models and/or stores the trained models. The ML operating module 122 includes instructions for loading trained ML models and associated ML parameters (e.g., artificial neural network weights), and ML operation data. The email processing module 124 includes computer-executable instructions for reading raw email data and performing extract-transform-load (ETL) manipulations as well as data normalization. It should be appreciated that the plurality of modules in the application modules 114 may communicate with one another in a shared or unshared memory space. For example, the ML training module 120 may construct an ML model, train the ML model, and pass the trained ML model to the ML operating module 122 for use. The email processing module 124 may process a series of emails and feed each processed email, in bulk or in chunks, to the ML operating module 122, and so on. Furthermore, in some embodiments, additional or fewer modules may be included in the application modules 114. For example, the ML training module 120 may be split up into multiple ML training modules, wherein each individual module corresponds to training a particular type of machine learning model or subpart (e.g., one for a deep neural network, one for a long-short-term memory (LSTM) model, one for a simple recurrent neural network (RNN), etc.).

The electronic device 102 may be coupled to a products database 130 and a user interface 132, the latter of which may include a display device 134 and/or an input/output (I/O) device 136. The electronic device 102 may be further communicatively coupled to a mail server 140.

The database 130 may include one or more suitable databases (e.g., a structured query language (SQL) database, a flat file database, a key/value data store, an in-memory database, etc.). The database 130 may store trained models, training data and/or emails used by the application modules 114. The database 130 may provide information relating to email processing, customers and products (e.g., customer account numbers, Electronic Data Codes (EDCs), item descriptions, linguistic regular expression patterns, manufacturer codes, quantities, prices, etc.) to components of the environment 100. The database 130 may store data in one or more tables relating to emails having one or more columns (e.g., sub label, email ID, addresses to, email body, email subject, prior context, prior sender, email thread index, information extracted, etc.).

A user (e.g., a customer, an AM, etc.) may use the user interface 132 to access the electronic device 102. Specifically, the user may view information via the display device 134 and/or enter information via the I/O device 136. The display device 134 may be, for example, a computer monitor, screen, etc. The I/O device may include one or more computer peripheral devices (e.g., a mouse, keyboard, etc.). In some embodiments, the user interface 136 may be a single integrated device that includes both a display device 134 and an I/O device 136 (e.g., a tablet having a capacitive touch screen). The user may use the electronic device 102 to access the application modules 114 (e.g., to load data for training an ML model, or to load a saved model to test the predictions of the trained ML model, to view email in the mail server 140, etc.). The user may query a product application programming interface (API) 138 for information relating to various products.

The product API 138 may be an API for accessing information about the company's products. In some embodiments, the product API 138 may include multiple APIs relating to different companies. For example, the company may be a reseller of products from company B. In that case, product API 138 may permit a user of the electronic device 102 to programmatically obtain results relating to the products of company B such as: current price, quantity available, item weights/dimensions, logistical information (e.g., shipping times), etc. In some embodiments, the product API 138 may include an API for obtaining discrete information relating to a particular service (e.g., an API which allows the company to send mass emails).

The mail server 140 may be a software component included within the electronic device 102 (e.g., an instance of the Postfix mail server or another open source mail server). In other embodiments, the mail server 140 may be provided by a third-party (e.g., a Microsoft Office 365 server). The mail server 140 may include instructions for pipelining email sent to particular email addresses (e.g., mail sent to AMANDA@cdw.com) associated with an AM digital assistant to the memory 112 and/or to particular modules within the application modules 114 for processing. The pipelined email may be transmitted using an email-based protocol or via direct transfer (e.g., via an operating system copying the email). For example, the mail server 140 may include instructions such that when an new email is received, and the email is addressed to AMANDA@cdw.com, the email is immediately provided to the email processing module 124 (e.g., as input to the standard input (STDIN) I/O stream of the email processing module 124). In another embodiment, the instructions may cause the mail server 140 to persist the email to a local or remote storage (e.g., the database 130) for later processing. The mail server 140 may permit the electronic device 102 to send/receive email messages according to standard email encodings/protocols, such as those specified in the Internet Engineering Task Force (IETF) Request for Comments (RFC) 2822, entitled, "Internet Message Format" and in accordance with the protocol designations of IETF RFC 2821, entitled "Simple Mail Transfer Protocol" and IETF RFC 3501, entitled "Internet Message Access Protocol." However, it should be noted that although the present techniques include a preferred embodiment involving email message transmission; as noted, other transport mechanisms (e.g., text messaging) may be used in some embodiments. In general, the mail server 140 receives messages (e.g., RFQs) from the customer 104 and the AM 106, and hands those messages off for further processing. The email server 140 may send and receive messages from customer to customer, from customer to AM and vice versa, and from AM to AM.

The customer 104 may use a customer device 160 to submit an RFQ via the network 108. For example, the customer 104 may use a mobile computing device (e.g., a smart phone, a laptop, etc.) to send an email or other electronic communication including an RFQ. In an embodiment, the customer 104 may submit the RFQ to the mail server 140 using a computer application provided by the company which may include shortcuts for RFQ submission (e.g., an order form). The RFQ may include a set of header fields followed by a body, including a message written in natural language:

From:           example.user@example.com
To:             AMANDA@cdw.com
Subject:              Need a Quote.
Date:                 Thu, 26 Apr 2018 22:09:27 +0000
Hi Paul, We want a quote for the following products: Tripp Lite DVI
Coupler Gender Changer Adapter Connector Extender DVI-I F/F EDC
1141357 QTY 5 Crucial MX500 - solid state drive - 1 TB - SATA 6Gb/s
EDC #4913706 QTY 2 C2G Value Series video cable - S-Video - 25 ft
EDC #1700883 QTY 2

The customer 104 may include one or more EDC numbers including respective corresponding quantities that the customer 104 desires to purchase within the body of the RFQ message. In some embodiments, EDC codes may correspond to services (e.g., cloud-based services) rather than products. Further RFQ examples are provided below. The customer 104 may also receive responses from other components within the AM virtual assistant environment 100 via the network 108 and the customer device 160. For example, the customer 104 may receive a quotation corresponding to the RFQ. The customer 104 may also place an order using the customer device 160, by transmitting an affirmative response message such as, "Place my order" or simply, "Yes" in response to a quotation message. The customer 104 may decline to place an order by transmitting a negative response (e.g., "No, thank you."). The email processing module 124 may interpret and process customer order confirmations.

The AM 106 may send messages (e.g., email) to the AM virtual assistant environment 100 (e.g., to the mail server 140) via the network 108. The AM 106 may use an AM device 170 to submit the email (or another message) via the network 108. For example, the AM 106 may use a mobile computing device (e.g., a smart phone, a laptop, etc.) to send an email or other electronic communication including an RFQ. In some embodiments, the AM 106 may send a message which corresponds to the customer RFQ:

From:           AM@cdw.com
To:             AMANDA@cdw.com
Subject:              Need a Quote for Customer 104.
Date:                 Thu, 26 Apr 2018 23:09:27 +0000
Please prepare a quote for customer 104 including the following
products: Tripp Lite DVI Coupler Gender Changer Adapter Connector
Extender DVI-I F/F EDC #1141357 QTY 5 Crucial MX500 - solid state
drive - 1 TB - SATA 6Gb/s EDC #4913706 QTY 2 C2G Value Series
video cable - S-Video - 25 ft EDC #1700883 QTY 2

The mail server 140 may receive the message of the AM 106 and process the message as described with respect to message received from the customer 104. The AM 106 may receive an email response including a quotation corresponding to the RFQ, and may reply to the quotation with an affirmative or negative order response. The AM 106 may use an AM device 170 (e.g., a mobile device, laptop, desktop, etc.) to send and receive messages to components within the AM virtual assistant environment 100 via the network 108.

The network 108 may include the Internet and/or another suitable network (e.g., a local area network (LAN), a metropolitan area network (MAN), a wide area network (WAN), a mobile, a wired or wireless network, a virtual private network (VPN), etc.).

In operation, the electronic device 102 may be accessed by a user (e.g., a coworker of the AM 106) to perform offline training of one or more ML models, using the user interface 132. The user may load computer-executable instructions in the memory 112 which, when executed by the processor 110, cause an ML model to access training data (e.g., manually-labeled training data) stored in the database 130. The ML model may be iteratively trained until a loss function is minimized. Once the ML model is sufficiently trained, the ML model may be stored for later use in the database 130, Hadoop server, etc. Multiple ML models may be trained. For example, a first ML model may be trained to perform an information extraction function, and a second ML model may be trained to perform a classification function. The use of a hybrid random forest classifier and deep learning classifier to implement an AM virtual assistant is not currently known in the art.

Once the hybrid models are trained, the models may be loaded into the AM virtual assistant environment 100 at runtime, and used to process emails during the runtime of the AM virtual assistant environment 100. Specifically, the hybrid trained models may be used to analyze email messages received by the mail server 140. For example, the first ML model may be used to determine a set of (Item, Quantity) tuples within an RFQ sent by a customer/AM, wherein the Item uniquely identifies a product for sale and the Quantity identifies the respective quantity desired. As discussed below, the virtual assistant environment 100 may analyze the same email (e.g., the domain name of the sender of the email) to determine whether the email was sent by a customer or an AM. Depending on the results of information extraction and/or classification, the AM virtual assistant may take additional actions, as described below.

Example Preferred RFQ Pipeline Embodiment

Figure 2A:
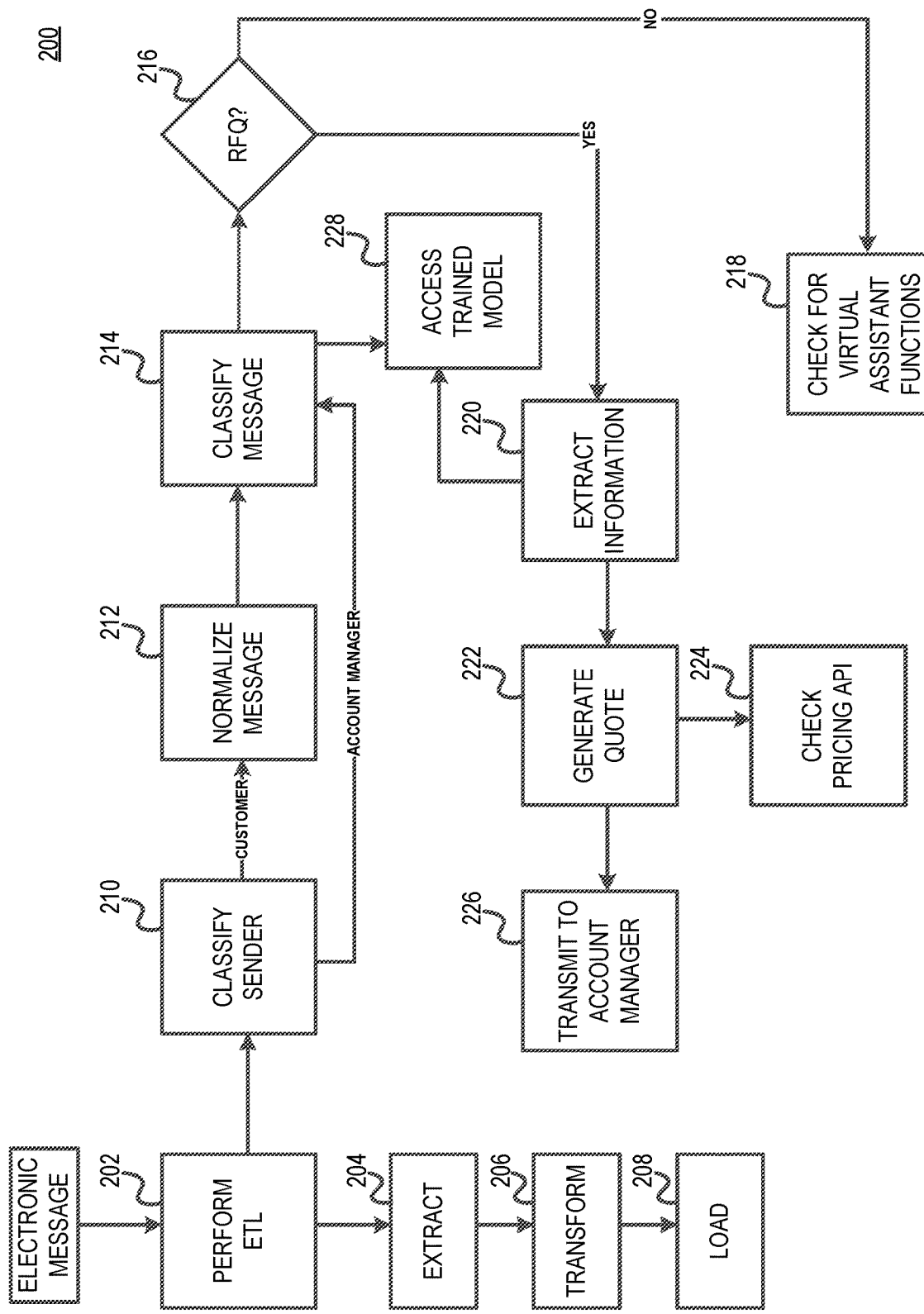
FIG. 2A depicts a flow diagram of an example RFQ pipeline method, according to a preferred embodiment.

FIG. 2A depicts a flow diagram of a preferred example RFQ pipeline method 200, according to an embodiment. The AM virtual assistant environment 100 may implement the method 200 for implementing automated processing of electronic messages from users (e.g., customers, AMs, other employees, etc.). The method 200 may include performing an Extract-Transform-Load (ETL) procedure on an electronic message (block 202). The method may retrieve/receive the electronic message from a mail server, such as the mail server 140. The ETL procedure may include extracting the message (block 204). For example, the method 200 may retrieve the electronic message from a mail server (e.g., an IMAP server). The method 200 may separate a body of the message from metadata of the message (e.g., headers) and/or attachments of the message. The method 200 may include transforming the electronic message (block 206). For example, attachments (e.g., images, text, etc.) may be compressed or scanned for viruses or malware. The method 200 may include loading the electronic message (block 208). For example, the method 200 at block 208 may copy the message to a file stored on a file system (e.g., the memory 112) and/or to an electronic database (e.g., the database 130). In some cases, the method 200 may load data into a data warehouse that is physically remote from the system 100, yet which is accessible via the network 108.

The method 200 may include classifying the sender of the message by analyzing the sender email address (block 210). For example, at block 210, the method 200 may analyze one or more email headers corresponding to the sender of an email. For example, when the message is an email message, some headers that the method 200 may analyze to determine the sender may include the From header, Reply-To header, Return-Path header, etc. The analysis at block 210 may include parsing an email address and/or addr-spec as defined in RFC 5322. For example, the method 200 may include a regular expression for analyzing an email address such as "John Smith <jsmith@example.com>" to extract a domain name (in this case, example.com). The method 200 may include checking the domain name against a pre-determined list of domain names to determine whether the domain name corresponds to an AM or a customer. For example, if the domain name is example.com, then the block 210 may classify the message as belonging to an account manager and if the domain name is any other domain name, then the block 210 may classify the message as belonging to a customer.

When the message is that of a customer, the method 200 may normalize the body of the message (block 212). In general, the normalization step at block 212 includes transforming the message to produce a second message having a standardized set of information. For example, when the message is an email, the method 200 may decode the name of the sender using a series of regular expressions as follows:

```
Decode the original name
sender_name = FullDecode(unicode(sender_name_orig, errors = 'ignore'))
If the name is an email address, return empty string
if '@' in sender_name:
    return ''
If the name is 'Fistname Lastname (extra info)', remove extra
sender_name=re.sub(r'\((.*)\)', '', sender_name)
If the name is 'Fistname [extra info] Lastname', remove extra
sender_name=re.sub(r'\[(.*)\]', '', sender_name)
If the name is 'Fistname Lastname -X', remove substring from -X
sender_name=re.sub(r' -X(.*)', '', sender_name)
If the name is 'Fistname Lastname II or III', remove substring from I
sender_name=re.sub(r' II(.*)', '', sender_name)
If the name is 'Fistname Lastname via ...', remove substring from via
sender_name=re.sub(r' via(.*)', '', sender_name)
If the name is 'Fistname Lastname - Contractor', remove substring from -
sender_name=re.sub(r' - Contractor).*)', '', sender_name)
If the name is 'Fistname Lastname x - extra info', remove substring from x
sender_name=re.sub(r' \w - (.*)', '', sender_name)
If the name is 'Fistname Lastname - extra info', remove substring from -
sender_name=re.sub(r' - (.*)', '', sender_name)
```

In this way, each message of a customer will include a sender name that is consistently formatted and validated across all received messages. The method 200 may normalize one or more other fields/headers of a message according to normalization strategies. As another example, the body of messages may be normalized to remove emojis, or to convert graphical emojis to their textual counterparts.

The method 200 may include classifying a message (block 214). The method 200 may access one or more trained models as discussed below (block 228). Messages which may be classified include messages from customers and account managers. To classify the message, the method 200 may apply the message to a trained machine learning model that was previously trained offline. For example, the ML operating module 122 may apply the normalized email message to a previously-trained machine learning model (e.g., a random forest classifier) that resides in a memory (e.g., the memory 112, a Hadoop server, etc.). At runtime, the trained model may be loaded into a memory where it is available for use to predict whether a given message corresponds to an RFQ. The trained machine learning model may output a 1 or 0, indicating whether the message is an RFQ or not.

When the message is not an RFQ, the method 200 may abort. In some embodiments, the message may be processed further to determine whether the message corresponds to a command from an AM with respect to performing a particular virtual assistant-related function (block 218). For example, in some embodiments, the system 200 may include the ability to analyze a message that does not correspond to an RFQ further to (e.g., to identify a command from an AM to map a customer's email address to a particular customer number, to retrieve tracking information, etc.).

When the message is an RFQ, the method 200 may include extracting information from the message (block 220). As discussed below, information extraction may include operating a trained machine learning model that was pre-trained offline and loaded by the method 200 at runtime. Information extraction at block 220 may identify information needed to generate a quote such as part numbers and respective quantities. In some embodiments, extracting information may include accessing one or more trained models (block 228). Accessing one or more trained models may include making a network call (e.g., via the network 108) and/or by accessing a database (e.g., the database 130). The one or more trained models may correspond to the trained models discussed with respect to FIG. 1. Accessing the trained models may include loading the one or more trained models via the ML operating module 122, and/or the ML training module 120. Accessing the one or more trained models may include submitting data to the ML operating module 122 (e.g., via an API call) and receiving a result. For example, an application module in the application modules 114 may pass the message to the ML operating module 122, wherein the ML operating module 122 may process the message using an already-trained ML model, and return the result of processing the message to the application module (e.g., a classification, a set of extracted information, etc.). One or more input layers of the trained ML model may be configured to receive aspects of the message (e.g., headers, body, etc.).

The method 200 may include generating a quote based on the information extracted (block 222). Generating the quote may include checking a pricing API (block 224). The pricing API may be queried according to one or more inputs (e.g., EDC, customer code, company code, etc.). In response to queries, the pricing API may output price, price code, price level, price source, etc. If multiple prices are available for a certain input, then the API may return the lowest price. The method 200 may include passing the lowest price and/or other information returned by the pricing API to another system/API for generating a quote. For example, when the information extraction step at block 220 determines that a customer wants to order a quantity of 10 widgets associated with a particular code, the method 200 may call a pricing API passing the quantity and code of the widgets as parameters. The pricing API may return an overall price, or an itemized price that the method 200 may insert into the generated quote (e.g., in the body of an email). For example, the method 200 may include instructions for outputting a list of prices formatted in an HTML table. In some embodiments, the pricing API may be an aspect of the product API 138.

The method 200 may include transmitting the quote to an AM (block 226). The AM may be a default AM, an AM associated with a customer's account, the sender of the message, or any other suitable AM that can be identified by any suitable means. As discussed below, transmitting the message to the AM may include delivering an email to the AM (e.g., via the mail server 140). In other embodiments, the message may be injected into a mail client of the AM (e.g., a Microsoft Outlook client), including a quote message.

The method 200 may be implemented using a visual flow building tool, such as Apache NiFi. Specifically, Apache NiFi is a flow-based automation tool that allows developers to define information processing flows within compute clusters. A NiFi implementation may include a host computer (e.g., the server 100) executing one or more Java Virtual Machines (JVMs), a flow controller including one or more processor and one or more extension, a web server, a FlowFile repository, a Content Repository, and/or a Provenance repository. The NiFi implementation may include local storage (e.g., memory 112).

It should be appreciated that the flow depicted that the processing of a message via the method 200 may occur simultaneously, or nearly simultaneously, to the delivery of that message to the AM's inbox, as discussed in FIG. 3B. For example, the present techniques may be configured so that a message may be delivered to an AM at the same time, or very briefly before, a quote based on that message is also delivered to the AM. In this way, an AM's message inbox (e.g., an email client) may appear to be delivered simultaneously. In some embodiments, a delay in email message delivery may be configured to allow the method 200 to process a message. In other embodiments, the delivery of an email message may be based on the completion of a process executed by a processor such as the processor 110.

Example Alternative RFQ Pipeline Embodiment

Figure 2B:
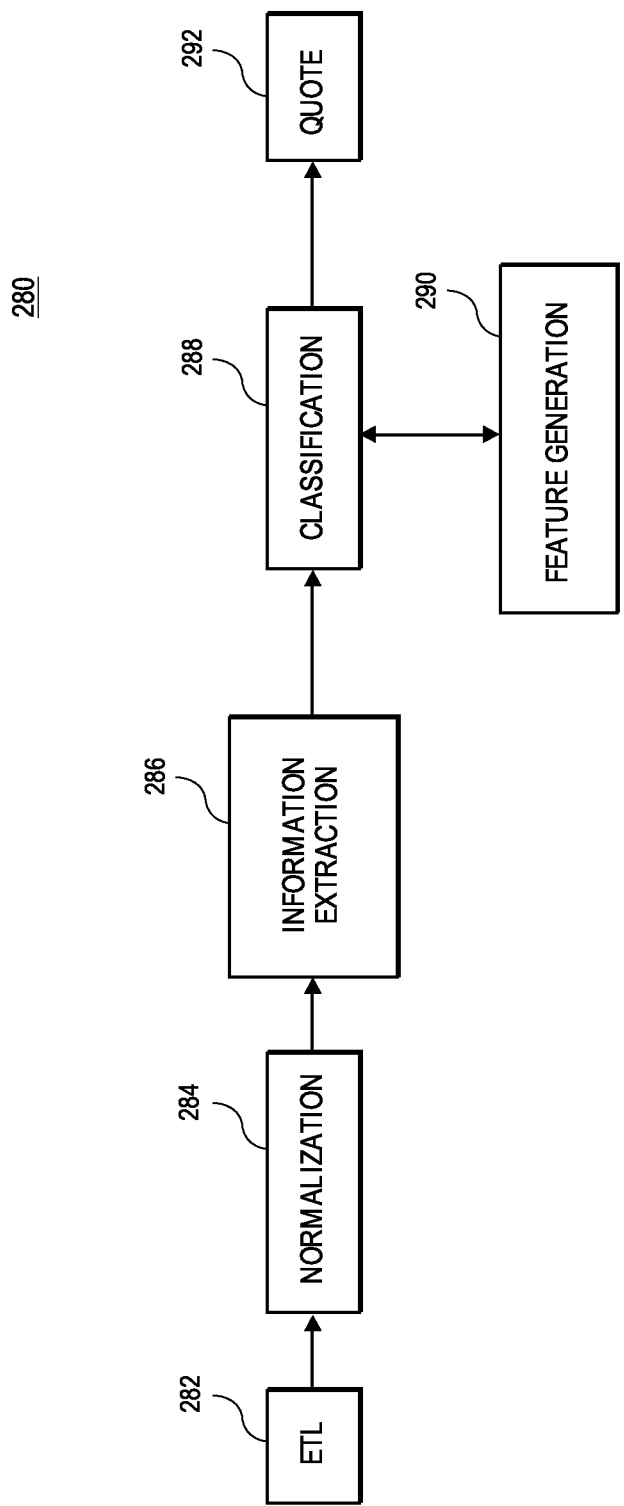
FIG. 2B depicts a block diagram of an example RFQ pipeline, according to an embodiment.

FIG. 2B depicts a block diagram of an alternative example RFQ pipeline 280, according to an embodiment. The AM virtual assistant environment 100 may implement the RFQ pipeline 280 for implementing automated processing of electronic messages from users. The RFQ pipeline 280 may include an ETL module 282. The ETL module 282, which may perform the ETL step at block 202 of FIG. 2, may receive an electronic message (e.g., an email) from a customer/AM and perform various ETL operations on the electronic message. The ETL module 202 may parse metadata and data of the electronic message. Specifically, in an email context, the ETL module 282 may examine the content type of the email message, and check whether the message is a multipart message. If the message is multipart, then the ETL module 282 may loop through each subpart of the multipart message. For each part, whether single part or multipart, the ETL module 282 may remove spurious information (e.g., emojis and whitespace) from the email message, save any attachments, decode the body of the message into a particular message encoding (e.g., UTF-8), and save the headers of the message. The ETL module 282 may store some or all portions of the metadata and data of the electronic message. If the message is a text message, then the ETL module 202 may execute a different set of instructions.

The ETL module 282 may analyze the message. For example, the ETL module 282 may check whether the content type of the message is valid. If a particular document type (e.g., a spreadsheet) is found to be attached to the message, then the ETL module 282 may transform each sheet of the spreadsheet into an individual machine-readable data structure, and may store the data structure. The ETL module 282 may use a series of regular expressions for extraction of various parts of the message (e.g., a sender's name).

In addition to the sender's name, the ETL module 282 may extract other headers using regular expressions, such as From, To, CC, Date, Subject, Return-Path, timestamp, sender telephone number, etc. The ETL module 282 may also include logic for extracting a signature from an email message, and for checking the validity of the signature. Further, the ETL module 282 may include instructions for masking personally-identifiable information (PII), such as credit card number, social security numbers, birth dates, and other potentially sensitive data. The ETL module 282 may include instructions for determining whether the message is addressed to and/or sent from, a sender associated with the proprietor of the AM virtual assistant environment 100 by checking, for example, whether the sender's email or telephone number exists in a database such as the database 130. If the sender is known, then the ETL module 282 may include a count of the number of internal email addresses included in the electronic message. The ETL module 282 may output a data structure of all of the fields (e.g., headers, body, addresses, names, etc.) that the ETL module 282 extracts from the electronic message. The data structure may be, for example, a delimited list. The normalization module 284 may receive as input the extracted information/data output by the ETL module 282.

The normalization module 284 may include various computer-executable instructions for normalizing the data output by the ETL module 282. For example, the normalization module 284 may access a table of information (e.g., from a flat file, or a database such as the database 130). The table of information may include a set of rows, wherein each row includes an EDC, an advertised price, a company code, and a manufacturer's code. The normalization module 284 may normalize the body of an email output by the ETL module 282, such that the specific product information included in the body is modified/rewritten to conform to universal strings. For example, multiple electronic messages may include different hyperlinks which each point to the website of the company, but which each include different subdomains and/or subfolders (e.g., deep links). The normalization module 284 may include instructions for processing each electronic message body and rewriting any such links so that each one is replaced by a string such as 'CDWURL.' The normalization module 284 may perform similar transformations for external links (i.e., those links to organizations other than the proprietor), manufacturer codes, EDC codes, quantities, prices, etc.

The ETL module 282 and/or the normalization module 284 may store some, or all, input and/or output in the database 130 or another suitable location. For example, the ETL module 282 may write its output to the database 130 and the normalization module 284 may load some or all of that data from the database 130 at a later time. The normalization module 284 may store the normalized electronic message in association with the original electronic message, and/or the result produced by the ETL module 282. It should also be appreciated that the ETL module 282 and/or the normalization module 284 may provide their respective outputs to other processors downstream (e.g., to a Hadoop instance). The electronic message (e.g., an .eml file) and the output of the ETL module 282 and/or normalization module 284 may be stored in the database 130 using a relational linkage (e.g., using one or more primary keys, a one-to-many or many-to-many relationship in an SQL database).

In general, once the ETL module 282 and normalization module 284 have respectively ETLed and normalized the electronic message, whether the message is received via email or otherwise, the company may want to process the message further. As noted, the message may be from a customer (e.g., the customer 104) or an AM (e.g., the AM 106). Therefore, the company may want to analyze the message to determine the identity of the sender, to obtain a mapping between any items and quantities that appear in the message, and/or a mapping between any items and EDC/manufacturer codes within the message. Another component of the RFQ pipeline 280 may use the item/quantity and/or item/code mappings to generate a quote for the customer and/or AM. The identity of the sender may be analyzed by downstream components to determine specific actions.

As noted above, both AMs and customers may send RFQ messages that are written in natural language. Returning to the example above, the RFQ message included the following:

---

Hi Paul, We want a quote for the following products: Tripp Lite DVI Coupler Gender Changer Adapter Connector Extender DVI-I F/F EDC #1141357 QTY 5 Crucial MX500 - solid state drive - 1 TB - SATA 6Gb/s EDC #4913706 QTY 2 C2G Value Series video cable - S-Video - 25 ft EDC #1700883 QTY 2

---

The EDC/manufacturer codes and respective quantities included in the above RFQ are:

(1141357,5), (4913706,2), (1700883,2).

If customer messages were always written in a structured format, then determining the codes and quantities during the information extraction process would be trivial. An approach in the prior art uses regular expressions exclusively for such determinations. However, in reality, an email may include infinitely many combinations of numbers in differing formats. For example, each RFQ may include multiple products associated with one or more quantities: "can I get one/1 of . . . ?" or, "can I get one of the following: x product, y product, and z product?", or "can I get one X, two Yz, and three Zs." And at minimum, an EDC code, a price, a quantity, and a customer code may be necessary to create a quote/order.

The RFQ pipeline 280 may further include a classification module 288 for training an ML model to classify the intent of messages. For example, the classification module 288 may determine whether an email message is an RFQ or a non-RFQ. In an embodiment, the classification module 288 may train a random forest binary classifier using manually-labeled messages (e.g., emails) divided into RFQ and non-RFQ categories (e.g., wherein each message in a training data set is labeled with a 1 or 0 depending upon whether that message represents an RFQ or a non-RFQ). Non-RFQ messages may be further subcategorized, in terms of whether the non-RFQ message literally includes the word "quote" or a derivation thereof (e.g., "QuOtE," "quoting," "quoted," "pricing," etc.). The classification training data set may comprise a plurality of rows, wherein each row includes an email body, a set of from addresses, a label, and an indication of whether the email body includes a derivation of the word "quote" or similar. In an embodiment, the email body may be normalized as described with respect to the normalization module 204. Duplicates may be removed from the training data set.

The classification module 288 may then generate a set of features for each row in the training data set using a feature generation module 290. The feature generation module 290 may be implemented as an additional module in the set of application modules 114. The feature generation module 290 may process each email body and set of from addresses within each row in the training data set using computer-executable instructions (e.g., conditional statements, loops, regular expressions, etc.). First, the feature generation module 290 may convert the email body to lowercase. The feature generation module 290 may use a regular expression to determine whether certain types of phrases appear within the email body. For example, the feature generation module 290 may use regular expression such as the following to determine whether the email body likely includes an attachment:

```
((attached|please|if|do|i|here|get) (is|find|see|you|we|need|into)
(your|the|need|to) (requested|attached|a separate|re|corrected|above)
quote)|((attached|several)[^/./!/?/,/^*]{0,9}(quote|quotes)\s(you|were)
requested)|((quote|please|this) (use|forward|order|quote|find)
(information|quote|converted))|((i|please|ordered|will|shall|can)
(provided|archive|update|from|find|generate)
(a|the|this|another|attached|the)
(quote|the))|((can|may)\s(i|we)[^/./!/?/,/^*]{0,12}\s(status))|([^/./!/
?/,/^*]{0,7}renewal quote)|(please (reply|respond) to e-
mail)|((added|provide|don\'t|may|update|not)
(to|him|need|understanding) (a|this|the|that)
quote)|((updated|revised|attached|can|your|to) (quote|quotes))
```

The RFQ pipeline 280 may include an information extraction module 286 for training an ML model to perform information extraction, without the need to author regular expressions. The information extraction module 286 may be able to determine items and quantities from within any free-form RFQs, including those RFQs that the information extraction module 286 has not previously examined, by training an ML model to identify item/quantity and/or item/code mappings within text-based RFQs (e.g., emails, text messages, etc.). In an embodiment, the information extraction module 286 includes instructions which create a mapping of all possible combinations of items and quantities (e.g., N number items and M possible quantities), based on a curated training data set. The information extraction module 286 may compute the cross product of N and M giving N×M records. Each record may include a label=1 representing a correct pairing, and a label=0 representing an incorrect pairing. Each message in a training data set may be associated with multiple instances of 1s and 0s. The N×M matrix may include one row for each message in the training data set, wherein each message is normalized using the normalization module 284, and each message/row is associated with every possible combination of item from 1 . . . M and each possible quantity from 1 . . . N, and each message/row is associated with a label of 1 or 0, depending upon whether the item and quantity appear within the normalized email. This N×M matrix may then be used by the ML training module 120 to train an ML model. The ML training module 120 may, in some embodiments, include instructions for evaluating the precision and/or recall of trained models using a subset of training data.

In an embodiment, a training module (e.g., the ML training module 120) may use the N×M matrix to train an artificial neural network (ANN) and/or a deep learning classifier, wherein the network determines the highest confidence score of the mappings from item to quantity. The ML training module 120 may use word embeddings, word counts, and/or character counts corresponding to messages as training data. The ML training module 120 may shuffle the N×M matrix to avoid biasing the network during training and then divide the N×M matrix into three respective training, validation, and test data sets, according to, for example, a 70/20/10 split. In an embodiment, the ML training module 120 may include a character-level tokenizer which tokenizes each normalized email in the N×M matrix. The character-level tokenizer may be suitable, whereas a word-level tokenizer is not, due to the fact that many of the words tokenized are not vocabulary words in a lexicon, but are rather numbers (e.g., part numbers, quantities, etc.) which have no independent meaning. By using character-level embeddings, the ML model can be made to recognize patterns that are language-independent.

The ML training module 120 may construct an ANN, wherein a first layer accepts a matrix of the size of the tokenizer, and which outputs a 3D tensor having a dense embedding of a fixed size (e.g. 256). A next layer may be a one-dimensional convolution layer, having an output dimensionality of 64, a window length of 3, using a rectified linear unit activation function. A third layer may be a max pooling one dimensional convolution layer having 3 max pooling windows. A fourth layer may be a one-dimensional convolution layer having an output dimensionality of 32. Layers 5-7 may be, respectively, LSTM layers having respective output dimensionality of 64, 32, and 16. Each LSTM layer may include recurrent dropout (e.g., 0.5). The final layer may be a deeply-connected neural network layer having an output dimensionality of 1, and using a sigmoid activation function. In an embodiment, the ANN may include a different architecture. For example, the ANN may include only the first layer and the final deeply-connected neural network layer. In yet another embodiment, a second layer may be inserted in between the first layer and the final deeply-connected neural network layer, wherein the second layer is a recurrent neural network (RNN) having a fixed output dimensionality (e.g., 128) or wherein the second layer is an LSTM having a fixed output dimensionality (e.g., 256). The training may include a binary cross-entropy loss function in some embodiments, along with a root mean square optimizer. The respective ANNs may be trained using the training data subset of the N×M matrix as training input for a varying number of epochs (e.g., 9, 15, 10, 11, etc.) using differing batch sizes (e.g., 32 or 64). The embodiments described have demonstrated real-world accuracy above 70, precision above 70, and recall above 58 using curated training data sets. Training using larger training data sets may improve all three metrics.

Once the data extraction ML model is trained, the ML model may be used to extract information from free-form RFQs which. For example, returning to the above example, the first message may read:

---

Hi Paul, We want a quote for the following products: Tripp Lite DVI Coupler Gender Changer Adapter Connector Extender DVI-I F/F EDC #1141357 QTY 5 Crucial MX500 - solid state drive - 1 TB - SATA 6Gb/s EDC #4913706 QTY 2 C2G Value Series video cable - S-Video - 25 ft EDC #1700883 QTY 2

Subsequent messages may read as follows:

| Message Number | Message Body |
|---|---|
| 2 | Hi Paul, Would you be able to generate the quote for below items? Tripp Lite DVI Coupler Gender Changer Adapter Connector Extender DVI-I F/F unspsc #1141357 x5 Crucial MX500 - solid state drive - 1 TB - SATA 6Gb/s unspsc #4913706 x2 C2G Value Series video cable - S-Video - 25 ft unspsc #1700883 x2 |
| 3 | Hi Paul, Hope everything goes well with you! I just want to check if you could provide a quote on the items listed below? Tripp Lite DVI Coupler Gender Changer Adapter Connector Extender DVI-I F/F mfg part: 1141357 (5) Crucial MX500 - solid state drive - 1 TB - SATA 6Gb/s mfg part: 4913706 (2) C2G Value Series video cable - S-Video - 25 ft mfg part: 1700883 (2) |
| 4 | Hi Paul, How are you doing? It would be great if you could generate a quote for me containing the items below. Thanks Tripp Lite DVI Coupler Gender Changer Adapter Connector Extender DVI-I F/F 5 of CDW Part: 1141357 Crucial MX500 - solid state drive - 1 TB - SATA 6Gb/s 2 of CDW Part: 4913706 C2G Value Series video cable - S-Video - 25 ft 2 of CDW Part: 1700883 |
| 5 | Hello, please quote the following: Tripp Lite DVI Coupler Gender Changer Adapter Connector Extender DVI-I F/F CDW Part: 1141357 q5 Crucial MX500 - solid state drive - 1 TB - SATA 6Gb/s CDW Part: 4913706 q2 C2G Value Series video cable - S-Video - 25 ft CDW Part: 1700883 q2 |
| 6 | Good morning Paul, Would you please send me the quote on these following items? Thanks Tripp Lite DVI Coupler Gender Changer Adapter Connector Extender DVI-I F/F CDW Part: 1141357 5pcs Crucial MX500 - solid state drive - 1 TB - SATA 6Gb/s CDW Part: 4913706 2pcs C2G Value Series video cable - S-Video - 25 ft CDW Part: 1700883 2pcs |
| 7 | Hi Paul, Let me know if you can quote on the following items and send it to me. Thanks Tripp Lite DVI Coupler Gender Changer Adapter Connector Extender DVI-I F/F Part1141357 qnty 5 Crucial MX500 - solid state drive - 1 TB - SATA 6Gb/s Part4913706 qnty 2 C2G Value Series video cable - S-Video - 25 ft Part1700883 qnty 2 |
| 8 | Hi Paul, Our company would like these following items quoted asap. Let me know when you can send it over. Thanks Tripp Lite DVI Coupler Gender Changer Adapter Connector Extender DVI-I F/F CDW Part 1141357 quant 5 Crucial MX500 - solid state drive - 1 TB - SATA 6Gb/s CDW Part 4913706 quant 2 C2G Value Series video cable - S-Video - 25 ft CDW Part 1700883 quant 2 |
| 9 | Hi Paul NEED THIS ASAP!!! Can you please send me a quote for the following: Tripp Lite DVI Coupler Gender Changer Adapter Connector Extender DVI-I F/F UNSPSC: 1141357 Quantity: 5 Crucial MX500 - solid state drive - 1 TB - SATA 6Gb/s UNSPSC: 4913706 Quantity: 2 C2G Value Series video cable - S-Video - 25 ft UNSPSC: 1700883 Quantity: 2 |

Despite the fact that the part numbers are expressed disparately in the free-form RFQs above (e.g., "EDC #1141357", "unspsc #1141357", "mfg part: 1141357", etc.), and despite the fact that the quantities are also expressed disparately (e.g., "q2", "2pcs", "Quantity: 2", "2 of", "(2)", "x2", etc.), the trained information extraction ML model may output identical EDC/quantity tuples in all cases: (1141357,5), (4913706,2), (1700883,2). Therefore, the information extraction module 206 may capably train one or more ML models to correctly determine EDC numbers and associated quantities from free-form text. Herein, EDC numbers, manufacturer part numbers, and item numbers may all refer to a numeric or alpha-numeric code used to identify products. In this way, AMs no longer need to manually log product code and associated quantity information contained in customer RFQs, and rigid order forms typically used to collect such information may be entirely eliminated, increasing the power of electronic communication means (e.g., email) to transmit such information.

The feature generation module 290 may generate features used in classification, prior to classifying a message. For example, the feature generation module 290 may use a separate regular expression to determine whether the email body includes a request word (e.g., "would," "could," "can," etc.) followed by the word "quote," and yet another regular expression to determine whether the email body includes a verb word (e.g., "need," "desire," "want," etc.) followed by the word "quote" or similar (e.g., a derivation thereof, or a word having a similar meaning). The feature generation module 290 may cross-reference the set of from email addresses against a list of distribution domains. The distribution domains may be domain names of partner companies who distribute products on behalf of the company. The feature generation module 290 may include additional logical checks for a number of additional features, such as whether certain phrases occur in the email body (e.g., "please", "quantity", "mfgnumber", "iteminfo", etc.). These logical checks may be performed in code and/or using regular expressions. The feature generation module 290 may return a list containing values of each of the respective examined features, wherein the values are simple or complex datatypes. For example:

```
return [contain_EDC_1, contain_MFG_1, contain_EDC_2,
    contain_MFG_2, contain_QTY, contain_Price,
    contain_cdw_url_prod, contain_cdw_url, contain_ext_url,
    contain_item_info, please_in_email, request_in_email,
    attach_is_the_quote, bid_email]
```

Of course, the above list is merely one possible list or set of relevant features, and it should be appreciated that other useful combinations of features are envisioned. Different sets of features may become more or less relevant due to changes in business constraints and communication patterns. For example, features that may be used to identify a request on the part of a user include:

```
[could_you_match,
    wild_card_1_word_count,
    wild_card_1_character_count,
    wild_card_2_word_count,
    wild_card_2_character_count,
    wild_card_3_word_count,
    wild_card_3_character_count]
```

In another example, features for a verb quote include:

```
[verb_a_quote_match,
    wild_card_1_word_count,
    wild_card_1_character_count,
    wild_card_2_word_count,
    wild_card_2_character_count,
    wild_card_3_word_count,
    wild_card_3_character_count]
```

In general, many features may be identified and used to program the system to extract any suitable types of information that may be indicative of a particular message type:

[is_distribution_domain, contain_EDC_1, contain_MFG_1, contain_EDC_2, contain_MFG_2, contain_QTY, contain_Price, contain_cdw_url_prod, contain_cdw_url, contain_ext_url, contain_item_info, please_in_email, request_in_email, attach_is_the_quote, bid_email]

In general, features identify whether a particular electronic message (e.g., an email or text message) includes a particular aspect. For example, questions such as whether a sender's email address belongs to a customer or partner (e.g., distribution partner), whether the body of an email includes phrases indicative of a call to action, whether the email include an EDC number, etc. Such features may not be dispositive of customer/AM intent when viewed in isolation. However, the classification module 288 may associate the set of features returned by the feature generation module 290 with each row in the training data set, and then use the combination of the labeled normalized email, and the features, to train a classifier machine learning model (e.g., a random forest classifier).

In an embodiment, the random forest binary classifier may be trained using a partitioned training data set. For example, the training data set may be partitioned according to a 70/30 split, respective to training and test data. The model may be fit to the training data, and various attributes of the trained model may be calculated (e.g., and out-of-bag score, accuracy score, precision score, recall score, confusion matrix, etc.). The trained model may be stored for later use, for example, in the memory 112 or the database 130. The trained model may also be loaded at a later time, and used to predict whether an email is an RFQ, or not. For example, an email body including, "order for roc. matt, good afternoon. quote for 50 ssd samsung evo 250 gb drives shipping to roc. thanks" and an email of "customer@example.com" may be analyzed by normalizing the email body, and performing feature generation on the output of the normalization.

Techniques are known which depend entirely upon using regular expressions to attempt to extract part numbers and quantities, and/or to attempt to determine the intent of messages. However, such approaches are not robust and have been demonstrated to have precision, accuracy and recall that is inferior to the ML-based techniques described herein. Further, the regular expression-based approaches are difficult to understand due to the intense symbolic complexity required in programming. Regular expressions are also not self-documenting in the way that most ML code is, and are difficult to debug. Therefore, the present techniques represent a significant leap forward by allowing the account manager virtual assistant techniques to 1) robustly identify the intent of messages, and to 2) robustly determine part numbers and quantities; and, based on 1 and 2, automate tasks involving customers and AMs. Further, as discussed with respect to FIG. 2, the pricing API may return information in addition to pricing information. This additional information may be displayed to the AM in conjunction with a quote, so that the AM can see not only pricing but also the additional information, allowing the AM to make a more informed decision as compared with any current approaches that may include only pricing.

Each of the blocks in the RFQ pipeline 280 may be implemented as respective sets of computer-executable instructions which may be loaded into memory. For example, the processor 110 of FIG. 1 may load any of the blocks (e.g., the normalization module 284) as an application module in the set of application modules 114 of the electronic device 102 of FIG. 1. The information extraction module 286 and the classification module 288 may be loaded, respectively and at different times, in the ML training module 120 and the ML operating module 122 of the set of application modules 114. The information extraction module 286 and the classification module 288 may be used independently of one another and/or in conjunction. In some embodiments, the information extraction module 286 may process an email, and the use (or non-use) of the classification module 288 may be based on the output of the information extraction module 286, or vice versa. The RFQ pipeline 280 may, in some instances, cause a quote to be created in a quote module 292.

The quote module 292 may be a set of computer-executable instructions that accepts one or more parameters and, based on those parameters, creates a quote. A quote may be an electronic object including one or more items by product number and respective quantity, a subtotal, a total, a tax/VAT amount, a shipping fee, etc. The shopping cart may be associated with a user (e.g., a customer and/or an AM). In the above example, the RFQ included:

Hi Paul, We want a quote for the following products: Tripp Lite DVI Coupler Gender Changer Adapter Connector Extender DVI-I F/F EDC #1141357 QTY 5 Crucial MX500 - solid state drive - 1 TB - SATA 6Gb/s EDC #4913706 QTY 2 C2G Value Series video cable - S-Video - 25 ft EDC #1700883 QTY 2

Here, the classification module 288 may classify the message as corresponding to an RFQ. Further, the information extraction module 286 may extract the following item and quantity tuples:

(1141357,5), (4913706,2), (1700883,2).

While the classification and information extraction steps may execute in any order, and/or simultaneously, performing classification prior to extraction may include certain benefits, such as avoiding the overhead of performing information extraction for each and every message received by the system 100. The RFQ pipeline 280 may then transmit the output of the classification module 288 (RFQ=yes), the tuples output from the information extraction module 286, and an identification of the sender of the email to the quote module 292. The quote module 292 may generate a quote and deliver the quote to an AM.

Example Automated Quote Generation

Figure 3:
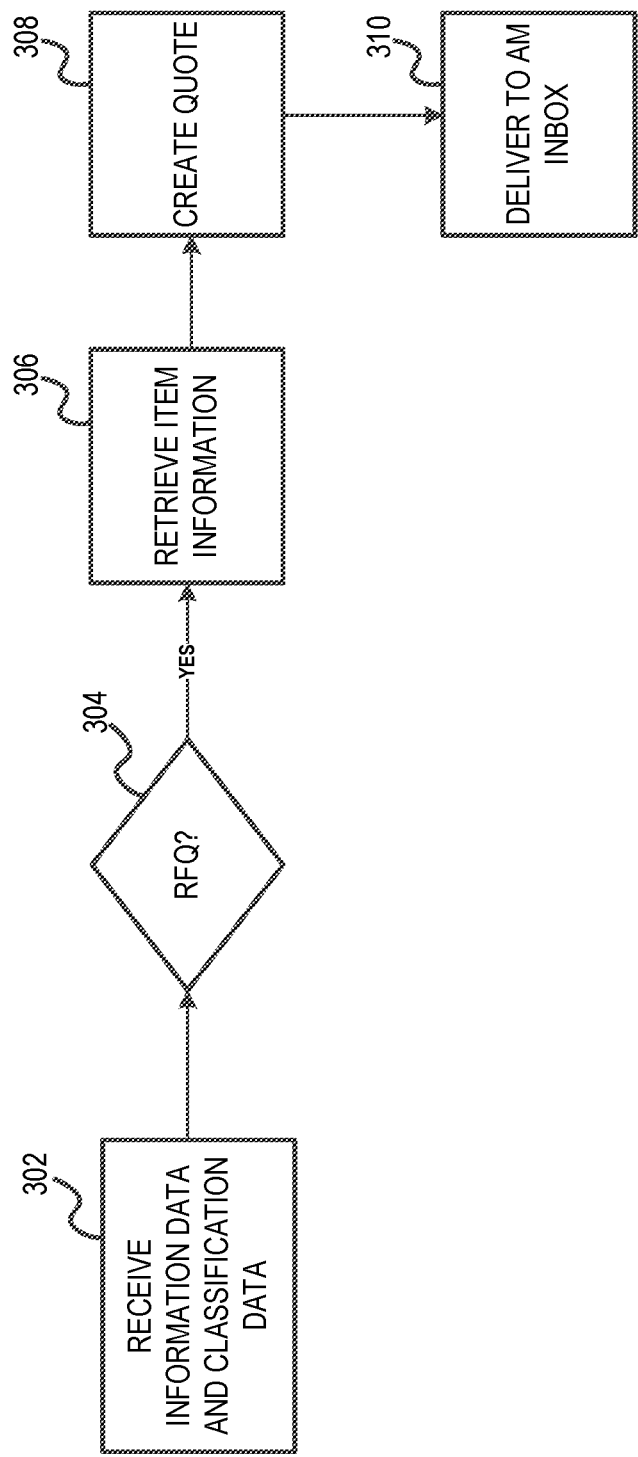
FIG. 3 depicts an example flow diagram of an account manager virtual assistant computing system.

FIG. 3 depicts an example order flow method 300, which may be performed by a module in the application modules 114 of FIG. 1. The method 300 may include receiving information extraction data from a first trained machine learning model and RFQ classification data from a second trained machine learning model, wherein the information extraction data and the RFQ classification data relate to an electronic message (e.g., an email received by the mail server 140) (block 302). The RFQ classification data may be generated by, for example, the classification module 208 of FIG. 2, and the information generation module 206 may generate the received information generation data.

The method 300 may include analyzing the RFQ classification data to determine whether the electronic message is an RFQ (block 304). When the electronic message is an RFQ, the method 300 may retrieve item information relating to the items specified in the RFQ (block 306). Retrieving item information may include querying a products API such as the products API 138, to retrieve prices and/or inventory information relating to each of the items sought by the sender. When the electronic message is not an RFQ, the method 300 may include other actions. A message may not be an RFQ when, for example, the AM sends a message to the account manager virtual assistant environment 100 (e.g., to the mail server 140), the message including a spreadsheet and the body of the message stating, "create a quote for customer C."

The method 300 may include creating a quote using the item and quantity tuples received as part of the information extraction data, by passing the tuples as parameters in a request transmitted to the products database/products API (block 308). The result of the request to the products database/API may include pricing, inventory and availability information which may be used in the quote. For example, using the example above, the request may indicate that all of the items are available for $20 apiece. Of course, other inventory and pricing outcomes are possible. Some products may be subject to discount pricing, volume discounts, etc. One or more line items may be added to the quote, each corresponding to one or more item(s) identified by the information extraction module 206, and each associated with up-to-date pricing and inventory information. The method 300 may store customer information (e.g., the sender email address) included in the extraction data in the quote.

In the above example wherein the message is not an RFQ, when the AM forwards an existing quote, then the method 300 may also determine that the message is not an RFQ, but rather than creating a new quote, the method 300 may update the forwarded quote according to text in the body of the forwarded message. For example, the method 300 may update the quote to include a spreadsheet sent by the AM. Or the method 300 may respond to the AM with a question, if the quote is missing necessary information (e.g., "What is the customer code?"). The AM may respond to this message, whereupon the method 300 may process the quote further.

The method 300 may include delivering the quote to the AM's inbox (block 310). For example, the quote module 212 may attach information relating to the order to an email and may transmit the quote (e.g., via email) to the AM (block 312). If the AM is using an email client that supports threaded email messages (i.e., conversations), then the method 300 may add a Thread-ID header at block 310 allowing the quote may be grouped in the inbox of the AM along with an original email from a customer that requested the quote. When the sender is not an AM (i.e., the sender is a customer), then the quote module 212 may query a database (e.g., database 130) or consult an in-memory data structure to retrieve information regarding the quote and/or the customer (e.g., whether the customer is a repeat/established/registered customer). The quote module 212 may attach quote response and customer information to an electronic message (e.g., an email), and send the quote to the AM, potentially requesting that the AM identify the customer via a response message. When the AM receives a quote message, the AM may reply to the quote message with a direction, such as "associate this customer with customer ID 1234." As noted, the method 300 may include other/additional instructions for processing AM directions.

Figure 4:
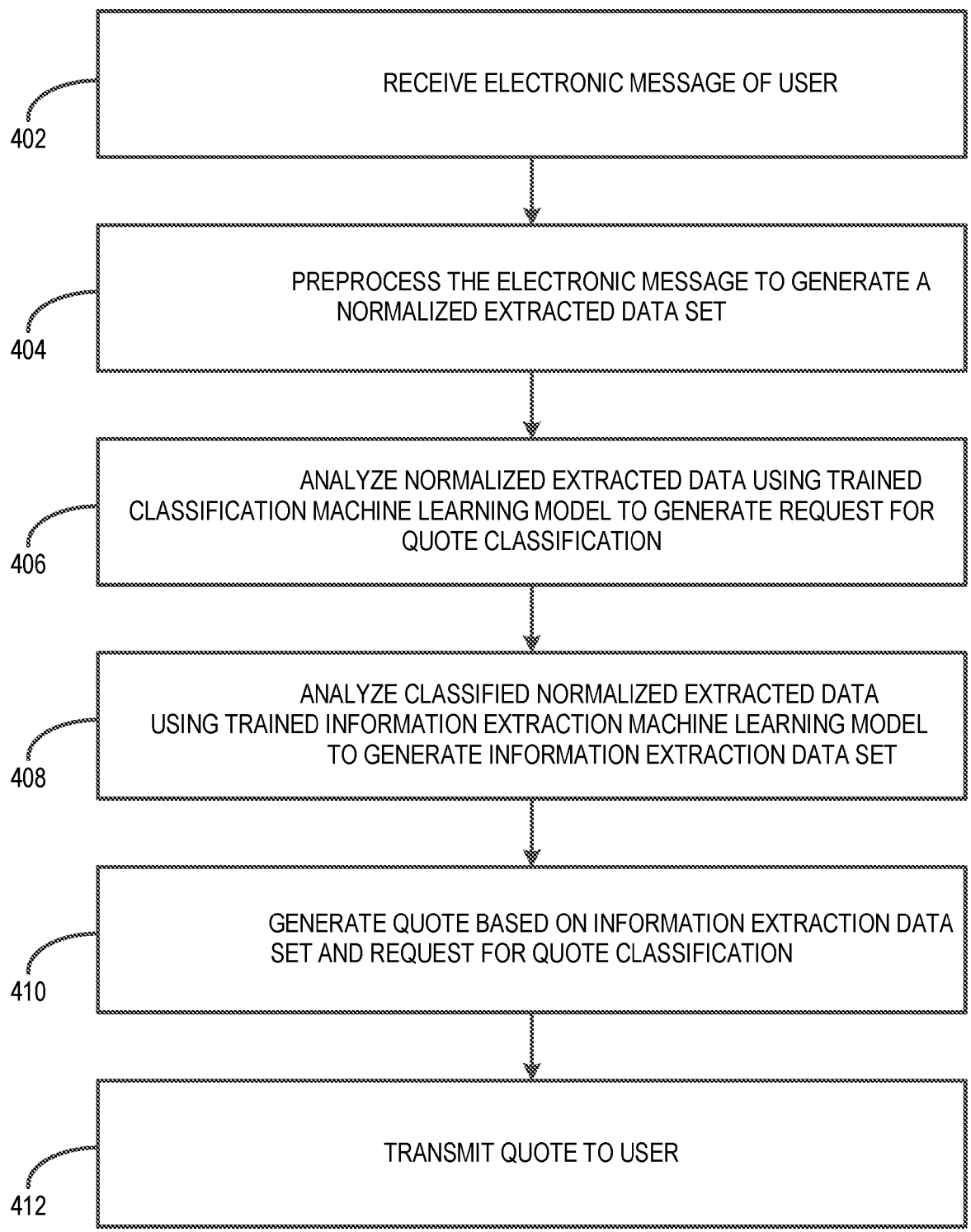
FIG. 4 depicts an example flow diagram of processing an electronic message using machine learning-based techniques.

The quote module 212 may associate the quote with the customer's account, and may transmit the quote to the AM. The quote communicated to the AM may include inventory, pricing, and availability information regarding the products that were the subject of the original RFQ, as depicted in FIG. 4. The quote may be included inline (e.g., in the body of an email, as a text message, as an attached document, etc.) and may include hyperlinks and/or other information (e.g., a completed order form) that the sender may use to accept or reject the quote. Once the AM has reviewed and approved of the quote, the AM may forward the quote to the customer.

Although the above depicts examples in which a sender identifies a particular part number (e.g., an EDC number) corresponding to a particular product, in an embodiment, the sender may request an item without supplying a part number. In that case, the information extraction module 206 may include additional instructions for identifying particular items. Further, the feature generation module 210 may include instructions for identifying cases in which a sender of an RFQ expresses a need (e.g., "I want") wherein the need is not immediately followed by an immediately identifiable object. In that case, the RFQ pipeline 200 may include an additional disambiguation module (not depicted) which provides the sender with one or more item suggested item based on the sender's expressed need. For example, if the information extraction module 206 determines that the sender has expressed a need for an item, and the classification module 208 has determined that the sender has, in fact, submitted an RFQ, then the RFQ pipeline 200 may provide the keyword to the disambiguation module. The disambiguation module may query a database/API (e.g., the products API 138) for items that match the keyword. The database, which may correspond to the data base 130, or the API may return one or more results, which may be scored according to how well the results match the keyword. The disambiguation module 200 may then provide zero or more of the results to the quote module 212, based on the scoring, whereupon the method 300 will create the quote and transmitted the quote the AM and/or the customer as discussed above.

In other cases, the quote module 212 may generate a recommendation that is based on the customer's order history, or facilitate a dialogue between the customer and a chat bot or other component capable of dynamically determining the customer's desired item.

Example Message Processing Using ML-Based Techniques

FIG. 4 depicts an example method 400 for processing messages in an account manager virtual assistant using trained ML models. The method 400 may include receiving an electronic message of a user (block 402). The electronic message may be an email received by the mail server 140, a text message/app message transmitted via the network 108, a payload POSTed via an HTTP server in communication with the electronic device 102, etc. Either the customer 104 or the AM 106 may transmit the electronic message.

The method 400 may include preprocessing the electronic message to generate a normalized extracted data set (block 404). Preprocessing the electronic message may include performing ETL operations on the message and/or normalizing the message, as discussed with respect to the ETL module 202 and the normalization module 204. The ETL and normalization of the message may occur in sequence or in parallel, depending on the embodiment. The result of the ETL and normalization operations may be a single normalized extracted data set (e.g., a hash table).

The method 400 may include analyzing the normalized extracted data using a trained classification ML model to generate an RFQ classification (block 406). The classification ML model may be a random forest binary classifier which outputs 1 if the message is an RFQ and which outputs 0 if the message is not an RFQ. The classification ML model may be trained on historical messages received from past customers that have been normalized and manually or automatically labeled/curated.

The method 400 may include analyzing the normalized extracted data set using a trained information extraction ML model to generate an information extraction data set (block 408). The information extraction ML model may analyze the normalized extracted data set and/or the original message. The ML model may include an input layer, one or more intermediate (i.e., hidden) layers, and an output layer. The output of the ML model may be a list of tuples representing a mapping of item numbers to respective quantities, as discussed with respect to FIG. 2. It should be appreciated that multiple additional models may be trained to extract other aspects of the RFQ. For example, in an embodiment, the customer's description of the item desired may be extracted, rather than a specific part number (e.g., "a video card"). The method 400 may include generating a quote based on the information extraction data set and the RFQ classification (block 410). For example, when the RFQ classification is no, then an existing quote may be retrieved/updated. The updated quote may be contained in the message (e.g., as a forwarded email) or may be retrieved from an external source (e.g., the database 130). The method 400 may compare the items in the existing quote to the items in the information extraction data and, if the information extraction data includes items that are not in the quote, then the method 400 may add the items that are not in the quote to the quote. When the RFQ classification is yes, then the method 400 may retrieve information relating to the items from an external source (e.g., the database 130 and/or the API 138).

The method 400 may include determining whether the sender is a customer or an account manager. The normalized extracted data set may include an indication of the sender of the message, such as an email address or return telephone number. The indication of the sender may be used to query one or more tables of customer/AM demographic information in a database (e.g., the database 130). If the sender is an AM, then the quote may be sent to the AM. The AM may forward the quote to the customer directly, or send a reply message, such as "send it to the customer," which will be classified as a non-RFQ message and may, in some embodiments, be processed by the third ML model associating AM directions with specific actions. If the sender is not an AM, then the method 400 may include determining whether a customer is identifiable, for example, by reference to a customer database.

The method 400 may include transmitting the quote to the user (block 412). For example, if querying the database/API does not locate a customer matching the sender email, then the quote may be forwarded to an AM for further analysis. If the customer is located, then the method 400 may check the quote for completion. If the quote is complete, then the method 400 may transmit the quote to the customer. The method 400 may transmit the quote to the customer via the same method that the message was sent to the account manager virtual assistant (e.g., via email). Alternately, the customer may request that quotes be sent via one or more other/additional delivery means (e.g., via text message, via postal mail, etc.).

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. An account manager virtual assistant computing system, comprising:
one or more processors, a mail server, an application programming interface connected to the mail server through an electronic network, and
a memory storing computer-readable instructions that, when executed, cause the account manager virtual assistant system to:
receive at the mail server an electronic message from a user device;
normalize the electronic message from the user device by extracting, transforming, and loading header and body information into a random access memory;
process the electronic message using a trained classification machine learning model to generate a classification data set including an indication of whether the electronic message is a request for quote, wherein the trained classification machine learning model is trained using a plurality of unique user-generated messages;
process the electronic message using a trained information extraction machine learning model to generate an information extraction data set including a set of item and quantity tuples,
wherein the trained information extraction machine learning model is a deep learning model;
when the electronic message is a request for quote:
generate a response including respective price information corresponding to each of the set of item and quantity tuples by, in response to receipt of the electronic message, retrieving pricing, inventory, and availability information via the product application programming interface (API), wherein generating the response further comprises transforming the information extraction data set into a structured quote format; and
transmit, at the mail server, the response in an electronic message to the user device that transmitted the original electronic message.

2. The account manager virtual assistant computing system of claim 1, wherein the electronic message is an email.

3. The account manager virtual assistant computing system of claim 1, the memory storing further computer-readable instructions that, when executed, cause the account manager virtual assistant system to:
determine, based on the information extraction data set, whether the user is an account manager or a customer.

4. The account manager virtual assistant computing system of claim 1, wherein the training of the trained information extraction machine learning model includes tokenizing the electronic message character-by-character.

5. The account manager virtual assistant computing system of claim 1, wherein the classification machine learning model is a random forest classifier.

6. A non-transitory computer readable medium containing program instructions that when executed by a computer of an account manager virtual assistant computing system comprising one or more processors, a mail server, and an application programming interface connected to the mail server through an electronic network, cause the computer to:
receive at the mail server an electronic message from a user device;
normalize the electronic message from the user device by extracting, transforming, and loading header and body information into a random access memory;
process the electronic message using a trained classification machine learning model to generate a classification data set including an indication of whether the electronic message is a request for quote, wherein the trained classification machine learning model is trained using a plurality of unique user-generated messages;
process the electronic message using a trained information extraction machine learning model to generate an information extraction data set including a set of item and quantity tuples,
wherein the trained information extraction machine learning model is a deep learning model;
when the electronic message is a request for quote:
generate a response including respective price information corresponding to each of the set of item and quantity tuples by, in response to receipt of the electronic message, retrieving pricing, inventory, and availability information via the product application programming interface (API), wherein generating the response further comprises transforming the information extraction data set into a structured quote format; and
transmit, at the mail server, the response in an electronic message to the user device that transmitted the original electronic message.

7. The non-transitory computer readable medium of claim 6, wherein the electronic message is an email.

8. The non-transitory computer readable medium of claim 6, the medium containing further program instructions that when executed, cause a computer to:
determine, based on the information extraction data set, whether the user is an account manager or a customer.

9. The non-transitory computer readable medium of claim 6, the medium containing further program instructions that when executed, cause a computer to:
tokenize the electronic message character-by-character.

10. The non-transitory computer readable medium of claim 6, wherein the classification machine learning model is a random forest classifier.

11. An account manager virtual assistant method implemented by one or more processors utilizing a mail server and an application programming interface connected to the mail server through an electronic network, comprising:
receiving at a mail server an electronic message from a user device;
normalizing the electronic message from the user device by extracting, transforming, and loading header and body information into a random access memory;
processing the electronic message using a trained classification machine learning model to generate a classification data set including an indication that the electronic message is a request for quote, wherein the trained classification machine learning model is trained using a plurality of unique user-generated messages;
processing the electronic message using a trained information extraction machine learning model to generate an information extraction data set including a set of item and quantity tuples,
wherein the trained information extraction machine learning model is a deep learning model;
having determined that the electronic message is a request for quote:
generating a response including respective price information corresponding to each of the set of item and quantity tuples by, in response to receipt of the electronic message, retrieving pricing, inventory, and availability information via a product application programming interface (API), wherein generating the response further comprises transforming the information extraction data set into a structured quote format; and transmitting, at the mail server, the response in an electronic message to the user device that transmitted the original electronic message.

12. The computer-implemented method of claim 11, wherein the electronic message is an email.

13. The computer-implemented method of claim 11, further comprising:
determining, based on the information extraction data set, whether the user is an account manager or a customer.

14. The computer-implemented method of claim 11, further comprising:
tokenizing the electronic message character-by-character.

15. The computer-implemented method of claim 11, wherein the classification machine learning model is a random forest classifier.

16. The computer-implemented method of claim 11, further comprising:
training the classification machine learning model to classify an intent of the electronic message.

17. The computer-implemented method of claim 11, further comprising:
training the information extraction machine learning model to extract one or more items each corresponding to a respective quantity.

* * * * *